United States Patent
Amr et al.

(10) Patent No.: US 10,894,743 B2
(45) Date of Patent: Jan. 19, 2021

(54) METHOD FOR ENHANCEMENT OF MECHANICAL STRENGTH AND $CO_2$ STORAGE IN CEMENTITIOUS PRODUCTS

(71) Applicant: Saudi Arabian Oil Company, Dhahran (SA)

(72) Inventors: Issam T. Amr, Khobar (SA); Bandar Fadhel, Dhahran (SA); Ali Shakir Al Hunaidy, Dhahran (SA); Rami A. Bamagain, Khobar (SA); Haeng Ki Lee, Daejeon (KR); Solmoi Park, Daejeon (KR)

(73) Assignee: Saudi Arabian Oil Company, Dhahran (SA)

( * ) Notice: Subject to any disclaimer, the term of this patent is extended or adjusted under 35 U.S.C. 154(b) by 470 days.

(21) Appl. No.: 15/855,348

(22) Filed: Dec. 27, 2017

(65) Prior Publication Data
US 2019/0194074 A1    Jun. 27, 2019

(51) Int. Cl.
*C04B 40/00*    (2006.01)
*C04B 28/18*    (2006.01)
(Continued)

(52) U.S. Cl.
CPC .......... *C04B 28/188* (2013.01); *B28B 11/245* (2013.01); *C04B 28/10* (2013.01);
(Continued)

(58) Field of Classification Search
CPC .......................... B28B 11/245; C04B 40/0231
See application file for complete search history.

(56) References Cited

U.S. PATENT DOCUMENTS 3,238,279 A    3/1966    Tarlton et al.
3,759,328 A *  9/1973    Ueber ............... E21B 43/24
                                                    166/272.1
(Continued)

FOREIGN PATENT DOCUMENTS

GB    644615 A        10/1950
WO    2014160168 A1   10/2014

OTHER PUBLICATIONS

International Search Report and Written Opinion dated Sep. 24, 2018 pertaining to International Application No. PCT/US2018/027068, 14 pages.
(Continued)

*Primary Examiner* — Timothy Kennedy
(74) *Attorney, Agent, or Firm* — Dinsmore & Shohl LLP

(57) ABSTRACT

A method for curing cementitious articles includes flowing dry steam and carbon dioxide ($CO_2$) simultaneously into a curing chamber containing a cementitious article. A relative humidity within the curing chamber may be between about 50% and about 70% and a temperature within the curing chamber may be between about 50° C. and about 70° C. A dry steam and $CO_2$ mixture with a $CO_2$ concentration between 2.5 vol % and 40 vol % is provided in the curing chamber and the cementitious article is cured for a duration between about 4 hours and 16 hours. Cementitious products cured with the method may have a $CO_2$ uptake of greater than 15 wt % and a mechanical strength at least 10% greater than a cementitious product cured only in dry steam or $CO_2$.

13 Claims, 3 Drawing Sheets

(51) Int. Cl.
- C04B 40/02 (2006.01)
- B28B 11/24 (2006.01)
- C04B 28/10 (2006.01)
- C04B 111/00 (2006.01)

(52) U.S. Cl.
CPC ...... *C04B 40/0231* (2013.01); *C04B 40/0263* (2013.01); *C04B 40/0281* (2013.01); *C04B 2111/00448* (2013.01)

(56) References Cited

U.S. PATENT DOCUMENTS

| | | | |
|---|---|---|---|
| 5,624,493 A | 4/1997 | Wagh et al. | |
| 8,845,940 B2 | 9/2014 | Niven et al. | |
| 2011/0296872 A1* | 12/2011 | Eisenberger | B01D 53/08 62/640 |
| 2014/0322083 A1 | 10/2014 | Kuppler et al. | |
| 2016/0236984 A1 | 8/2016 | Riman et al. | |

OTHER PUBLICATIONS

Li, Ze-Hua et al., "Effect of steam on CaO regeneration, carbonation and hydration reactions for CO2 capture" Fuel Processing Technology, Jun. 4, 2016, pp. 101-106, vol. 151, Elsevier BV, NL.

"Effect of carbon dioxide-air concentration in the rapid curing process on the properties of cement-bonded particleboard", Hermawan et al., J. Wood Science (2002), pp. 179-184.

"CO2 curing for improving the properties of concrete blocks containing recycled aggregates", Baojian, et al., Cement & concrete Composites (2013), pp. 1-8.

Examination Report pertaining to Application No. GC 2018-35305 dated Dec. 29, 2019.

* cited by examiner

METHOD FOR ENHANCEMENT OF MECHANICAL STRENGTH AND CO₂ STORAGE IN CEMENTITIOUS PRODUCTS

BACKGROUND

The present specification generally relates to a method of curing cementitious articles and, more specifically, a method of curing cementitious articles using steam plus carbon dioxide.

SUMMARY

Cementitious products such as concrete blocks, concrete steps, concrete counter tops, etc., may be commercially produced by forming a desired shape from a concrete mixture in a molding machine followed by curing. The concrete mixture may include a cement binder, sand, aggregate and water. The concrete mixture typically flows from a hopper into a product mold and a cementitious article with a desired shape is formed within the mold. The cementitious articles are then cured to form a cementitious product. The cementitious article may be cured slowly, for example, between 7 to 30 days, by exposure to air.

Accelerated curing may be used to increase the productivity of manufacturing cementitious products. Particularly, accelerated curing may be used to provide stable cementitious products relatively quickly, thereby reducing the time before the cementitious products can be shipped as finished products. Accelerated curing typically involves placing the concrete products in an enclosure or chamber, often referred to as a curing chamber, and controlling the temperature and relative humidity in the curing chamber for several hours. The cementitious products may sit in the curing chamber between about 8 to 48 hours before the cementitious products are sufficiently cured for packaging and shipping. However, energy requirements for accelerated curing may be cost prohibitive. Accordingly, a need exists for alternative methods of curing cementitious articles.

One embodiment for curing cementitious articles includes providing a cementitious article formed from a mixture of a cement binder, sand, aggregate, and water. The cement binder contains $Ca_3SiO_5$. The cementitious article is placed in a curing chamber, and a curing relative humidity between about 40% and about 80% and a curing temperature between about 50° C. and about 150° C., are maintained within the curing chamber. The cementitious article is cured by flowing a mixture of dry steam and $CO_2$ into the curing chamber while maintaining the curing relative humidity and the curing temperature for a duration between about 4 and about 24 hours. The concentration of $CO_2$ in the mixture of dry steam and $CO_2$ is between about 2.5% and about 20.0% and/or the concentration of $CO_2$ in the curing chamber is between about 2.5% and about 50%, by volume and the cured cementitious article has a $CO_2$ uptake of at least 15%, by weight.

Another embodiment for curing cementitious articles includes providing a cementitious article formed from a mixture of a cement binder, sand, aggregate, and water. The cement binder contains $Ca_3SiO_5$ and the cementitious article is placed in a curing chamber. A curing relative humidity between about 40% and about 80% and a curing temperature between about 50° C. and about 150° C. are maintained within the curing chamber. The cementitious article is cured by flowing a mixture of dry steam and $CO_2$ into the curing chamber while maintaining the curing relative humidity and the curing temperature for a duration between about 4 and about 24 hours. The concentration of $CO_2$ in the mixture of dry steam and $CO_2$ is between about 2.5% and about 20.0% and/or the concentration of $CO_2$ in the curing chamber is between about 2.5% and about 50%, by volume, and $Ca(OH)_2$ is formed in the cementitious article by at least one of the reactions $$2Ca_3SiO_5(s)+7H_2O(l) \rightarrow 3CaO.2SiO_2.4H_2O(s)+3Ca(OH)_2(s),$$

and $$2Ca_3SiO_5(s)+7H_2O(g) \rightarrow 3CaO.2SiO_2.4H_2O(s)+3Ca(OH)_2(s).$$

Also, $CO_2$ from the mixture of dry steam and $CO_2$ reacts with the cementitious article to form $CaCO_3$ in the cementitious article by at least one of the reactions $$2Ca_3SiO_5(s)+3CO_2(g)+4H_2O(l) \rightarrow 3CaO.2SiO_2.4H_2O(s)+3CaCO_3(s),$$

and $$Ca(OH)_2(s)+CO_2(g) \rightarrow CaCO_3(s)+H_2O(l).$$

In embodiments, the cured cementitious article has a $CO_2$ uptake of at least 15%, by weight, for example at least 20%, by weight.

In another embodiment, a method for storing carbon dioxide in a cementitious article includes providing a mixture of dry steam and $CO_2$, with a concentration of $CO_2$ between about 2.5% and 20.0% and/or the concentration of $CO_2$ in the curing chamber is between about 2.5% and about 50%, by volume, and providing a cementitious article formed from a mixture of a cement binder, sand, aggregate, and water. The cement binder includes $Ca_3SiO_5$. The cementitious article is placed into a curing chamber and a curing relative humidity between about 50% and about 70% and a curing temperature between about 50° C. and about 70° C. are maintained within the curing temperature. The mixture of dry steam and $CO_2$ is introduced and flows into the curing chamber for a duration between 4 and 24 hours thereby curing the cementitious article. The chemical compound $Ca(OH)_2$ is formed within the cementitious article by at least one of the reactions $$2Ca_3SiO_5(s)+7H_2O(l) \rightarrow 3CaO.2SiO_2.4H_2O(s)+3Ca(OH)_2(s),$$

and $$2Ca_3SiO_5(s)+7H_2O(g) \rightarrow 3CaO.2SiO_2.4H_2O(s)+3Ca(OH)_2(s).$$

Also, $CO_2$ from the mixture of dry steam and $CO_2$ reacts with at least one of the $Ca_3SiO_5$ and $Ca(OH)_2$ within the cementitious article to form $CaCO_3$ in the cementitious article by at least one of the reactions $$2Ca_3SiO_5(s)+3CO_2(g)+4H_2O(l) \rightarrow 3CaO.2SiO_2.4H_2O(s)+3CaCO_3(s),$$

and $$Ca(OH)_2(s)+CO_2(g) \rightarrow CaCO_3(s)+H_2O(l).$$

A $CO_2$ uptake in the cementitious article cured with the gas mixture of dry steam and $CO_2$ is at least 15%, by weight.

In another embodiment, a cementitious product is prepared by a process that includes pouring a concrete mixture into a mold and forming a cementitious article. The concrete mixture includes a cement binder with $Ca_3SiO_5$, aggregate and water. The cementitious article is placed in a curing chamber for a duration between 6 hours and 10 hours. The curing chamber may have a curing environment with a temperature between about 50° C. and 70° C., and a relative humidity between about 50% and about 70%. Dry steam and $CO_2$ are introduced into and flows within the curing chamber and a cured cementitious article is formed. A concentration, in volume percent (vol %), of $CO_2$ in the dry steam and $CO_2$ flowing into the curing chamber is between about 5 vol % and 10 vol %, and the dry steam and $CO_2$ flows into and through pores of the cementitious article. The chemical compound $Ca(OH)_2$ is formed within the cementitious article by at least one of the reactions $$2Ca_3SiO_5(s)+7H_2O(l) \rightarrow 3CaO.2SiO_2.4H_2O(s)+3Ca(OH)_2(s),$$

and $$2Ca_3SiO_5(s)+7H_2O(g) \rightarrow 3CaO.2SiO_2.4H_2O(s)+3Ca(OH)_2(s).$$

Also, $CO_2$ reacts with the cementitious article to form $CaCO_3$ in the cementitious article by at least one of the reactions $$2Ca_3SiO_5(s)+3CO_2(g)+4H_2O(l) \rightarrow 3CaO.2SiO_2.4H_2O(s)+3CaCO_3(s),$$

and $$Ca(OH)_2(s)+CO_2(g) \rightarrow CaCO_3(s)+H_2O(l).$$

The cured cementitious article is removed from the curing chamber and has a $CO_2$ uptake, in weight percent (wt %) greater than or equal to 15 wt %. In some embodiments, the $CO_2$ uptake in the cured cementitious article is greater than or equal to 20 wt %. In other embodiments, the $CO_2$ uptake in the cured cementitious article is greater than or equal to 25 wt %.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

The following text sets forth a broad description of numerous embodiments of the present disclosure. The description is to be construed as illustrative only and does not describe every possible embodiment sense describing every possible embodiment would be impractical, if not impossible, and it will be understood that any feature, characteristic, component, composition, product, step or methodology described herein can be deleted, combined with or substitute four, in whole or part, any other feature, characteristic, component, composition, product, step or methodology described herein. Numerous alternative embodiments could be implemented, using either current technology or technology developed after the filing date of this patent, which would still fall within the scope of the claims.

Figure 1:
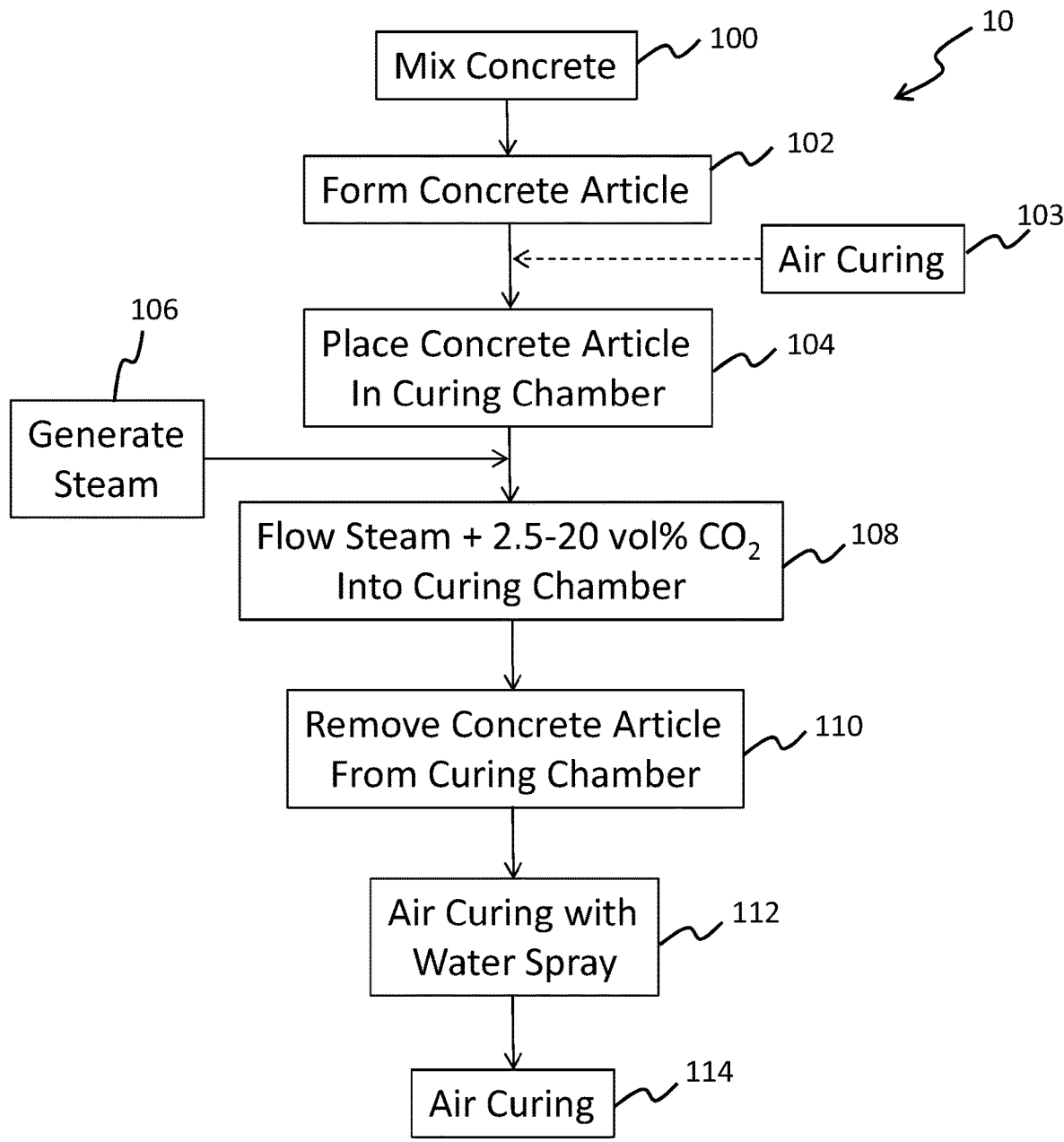
FIG. 1 is schematically depicts a process for curing cementitious articles according to one or more embodiments described herein.

Referring to FIG. 1, a method 10 for curing cementitious articles includes flowing a mixture of steam and carbon dioxide ($CO_2$) (also referred to herein as "steam plus $CO_2$" or "steam plus $CO_2$ gas mixture") simultaneously into a curing chamber with a cementitious article (also referred to herein as a "concrete article") located therein. As used herein, the term "cementitious article(s)" or "concrete article(s)" refers to an article formed from a concrete mixture before being cured and ready for shipment as a final product, and the term "cementitious product(s)" of "concrete product(s)" refers to a cementitious article that has been cured and is ready for shipment as a final product. Also, as used herein the term "steam" refers to "dry steam", i.e., water in the gas phase ($H_2O(g)$) and the term "$CO_2$" refers to $CO_2$ in the gas phase unless otherwise stated.

The concentration of $CO_2$ in the mixture of steam and $CO_2$, in volume percent (vol %), flowing into the curing chamber may be between about 2.5 vol % and about 40 vol %. That is, the volume of $CO_2$ relative to the total volume of steam plus $CO_2$ that flows into the curing chamber is between about 2.5 vol % and about 40 vol %. The steam and $CO_2$ reacts with compounds in the cementitious product, particularly tricalcium silicate, to form calcium hydroxide and calcium carbonate, both of which increase the strength of the cementitious product. Also, the $CO_2$ may react with calcium hydroxide formed during curing of the cementitious article to form calcium carbonate thereby sequestering $CO_2$ in the cementitious product. In embodiments, the amount of calcium hydroxide formed during early stages of curing is regulated such that the heat of hydration within the cementitious article is reduced compared to curing without $CO_2$. Not being bound by theory, the reduced heat of hydration within the cementitious article results in less thermal expansion of the cementitious article during early stages of curing and a reduction in microcracks formed within the cementitious article. The reduction of microcracks within the cementitious article results in an increase in strength for the cured cementitious product.

Still referring to FIG. 1, the method 10 includes mixing concrete at step 100. As used herein the term "concrete" refers to mixture of a cement binder, aggregate and water. The cement binder may be a Portland cement binder containing tricalcium silicate ($Ca_3SiO_5$ or $3CaO.SiO_2$), dicalcium silicate ($Ca_2SiO_4$ or $2CaO.SiO_2$), tricalcium aluminate ($Ca_3Al_2O_6$ or $3CaO.Al_2O_3.Fe_2O_3$), tetracalcium aluminoferrite ($Ca_4.Al_2Fe_2O_{10}$ or $4CaO.Al_2O_3.Fe_2O_3$) and gypsum ($CaSO_4 \cdot 2H_2O$). One non-limiting composition of a Portland cement binder is provided in Table 1 below.

TABLE 1

| Compound | Weight Percent |
| --- | --- |
| tricalcium silicate | 50 |
| dicalcium silicate | 25 |
| tricalcium aluminate | 10 |
| tetracalcium aluminoferrite | 10 |
| Gypsum | 5 |

While Table 1 provides a composition of a Portland cement binder, it should be understood that the method, and cementitious products formed by the method described herein, may include other types of cement binders. Non-limiting examples of cement binders that may be used with the method described herein include rapid hardening cement binders, low heat cement binders, sulfate resisting cement binders, white cement binders, pozzolanic cement binders, hydrophobic cement binders, colored cement binders, waterproof cement binders, blast furnace cement binders, air entraining cement binders, high alumina cement binders and expansive cement binders.

Aggregate within the cement binder may include chemically inert and solid bodies. The aggregate may have various shapes and sizes, and may be made from various materials ranging from fine particles of sand to large, course rocks. The aggregate may include ultra-light aggregate, light weight aggregate, normal weight aggregate, and heavy-weight aggregate. Non-limiting examples of ultra-light weight aggregate include vermiculite, ceramics spheres and perlite. Light weight aggregate may include expanded clay, shale or slate, or crushed brick. Normal weight aggregate may include crushed limestone, sand, river gravel, or crushed recycled a concrete, and heavyweight aggregate may include steel or iron shot, or steel or iron pellets.

In addition to the cement binder, aggregate and water, admixtures may be added to a concrete mixture to increase the durability, workability, strength, etc., of the concrete mixture and/or a cementitious product formed from the concrete mixture. For example, air entraining admixtures in the form of detergents may be added to concrete mixtures to improve durability and workability of the concrete mixture. Superplasticizer admixtures (e.g., polymer additives) may be added to increase strength of the cementitious product by decreasing water needed for workable concrete. Retarding admixtures such as sugar may be used to delay setting times of a concrete mixture and increase long-term strength of a cementitious product. In the alternative, accelerating admixtures such as calcium chloride may be added to speed setting time of a concrete mixture and improve early strength of a cementitious article. Mineral admixtures such as flyash may be added to improve work ability, plasticity and strength, and pigment admixtures such as metal oxides may be added to provide color to a cementitious product.

The concrete mixture is poured into a mold at step 102 and a cementitious article is formed in the shape of the mold. Non-limiting examples of molds and formed cementitious articles include blocks (commonly referred to as concrete blocks), stairs, countertops, pre-fabricated concrete walls, etc. The cementitious article is placed within a curing chamber at step 104. The temperature within the enclosure 200 (also referred to herein as the "curing temperature") may be controlled. For example, the curing temperature within the enclosure 200 may be between about 40° C. and about 80° C. In embodiments, the curing temperature within the enclosure 200 may be between about 50° C. and about 70° C. In other embodiments, the curing temperature within the enclosure 200 may be between about 55° C. and about 65° C. In still other embodiments, curing temperature within the enclosure 200 may be between about 57° C. and about 63° C. The relative humidity within the enclosure 200 (also referred to herein as the "curing relative humidity") may also be controlled. For example, the curing relative humidity within the enclosure 200 may be between about 40% and about 80%. In embodiments, the curing relative humidity within the enclosure 200 may be between about 50% and about 70%. In other embodiments, the curing relative humidity within the enclosure 200 may be between about 55% and about 65%. In still other embodiments, the curing relative humidity within the enclosure 200 may be between about 57% and about 63%.

In embodiments, the cementitious article may be air cured prior to placing in the curing chamber at step 103. As used herein, the term "air cured" refers to curing a cementitious article in ambient conditions, i.e., at ambient temperature and ambient relative humidity. For example, the cementitious article may be cured in ambient air for a duration between about 1 hour and 8 hours, for example 2 hours. In other embodiments, the cementitious article is not air cured prior to placing in the curing chamber at stop 104.

After the cementitious particle is placed within the curing chamber at step 104, a steam plus $CO_2$ gas mixture is introduced into the curing chamber at step 108. In embodiments, steam flows into the curing chamber through a first inlet and the $CO_2$ flows into the curing chamber through a second inlet that is different than the first inlet. In other embodiments, the steam plus $CO_2$ gas mixture is introduced into the curing chamber through the single inlet. The steam may be generated at step 106. For example, steam from a power boiler, a heat recovery system, and the like, may be pumped into the enclosure 200. The concentration of $CO_2$ in the steam plus $CO_2$ gas mixture may be between about 2.5 vol % and about 40.0 vol %. For example, the concentration of $CO_2$ in the steam plus $CO_2$ gas mixture may be equal to or greater than 2.5 vol %, 3.0 vol %, 3.5 vol %, 4.0 vol %, 4.5 vol %, 5.0 vol %, 5.5 vol %, 6.0 vol %, 6.5 vol %, 7.0 vol %, 7.5 vol %, 8.0 vol %, 8.5 vol %, 9.0 vol %, 9.5 vol %, 10.0 vol %, 10.5 vol %, 11.0 vol %, 11.5 vol %, 12.0 vol %, 12.5 vol %, 13.0 vol %, 13.5 vol %, 14.0 vol %, 14.5 vol %, 15.0 vol %, or 15.5 vol %, 16.0 vol %, 18.0 vol %, 20.0 vol %, 25.0 vol %, 30.0 vol %, or 35.0 vol %, and less than or equal to 40.0 vol %, 35.0 vol %, 30.0 vol %, 25.0 vol %, 20.0 vol %, 19.5 vol %, 19.0 vol %, 18.5 vol %, 18.0 vol %, 17.5 vol %, 17.0 vol %, 16.5 vol %, 16.0 vol %, 15.5 vol %, 15.0 vol %, 14.5 vol %, 14.0 vol %, 13.5 vol %, 13.0 vol %, 12.5 vol %, 12.0 vol %, 11.5 vol %, 11.0 vol %, 10.5 vol %, 10.0 vol %, 9.5 vol %, 9.0 vol %, 8.5 vol %, 8.0 vol %, 7.5 vol %, 7.0 vol %, 6.5 vol %, 6.0 vol %, or 5.5 vol %. In embodiments, the concentration of $CO_2$ in the steam plus $CO_2$ gas mixture may be between about 2.5 vol % and about 15.0 vol %. In other embodiments, the concentration of $CO_2$ in the steam plus $CO_2$ gas mixture may be between about 2.5 vol % and about 10.0 vol %.

The cementitious article is cured within the curing chamber at step 108 for a duration between about 2 hours and 24 hours. For example, the cementitious article may be cured within the curing chamber at step 108 for a duration between about 4 hours and about 16 hours. In embodiments, the cementitious article may be cured within the curing chamber for a duration between 6 hours and about 12 hours. In other embodiments, the cementitious article may be cured within the curing chamber for a duration between about 7 hours and about 9 hours, for example about 8 hours. During curing within the curing chamber, the steam plus $CO_2$ gas mixture flows into and through pores of the cementitious article and reacts with the cement binder to form calcium hydroxide and calcium carbonate as discussed in greater detail below. Formation of the calcium hydroxide and calcium carbonate within the cementitious article has a twofold benefit during the curing process. Particularly, formation of the calcium hydroxide and calcium carbonate results in an increase in strength of the cementitious article and formation of the calcium carbonate results in $CO_2$ uptake ($CO_2$ sequestration) by the cementitious article. As used herein, the term "$CO_2$ uptake" or "$CO_2$ sequestration" refers to the long term storage of $CO_2$ within a cementitious article or cementitious product. In embodiments, the cured cementitious article may have a $CO_2$ uptake, in weight percent (wt %) greater than or equal to 15 wt %. In other embodiments, the cured cementitious article may have a $CO_2$ uptake greater than or equal to 20 wt %. In still other embodiments, the cured cementitious article may have a $CO_2$ uptake greater than or equal to 25 wt %.

The cured cementitious article (cementitious product) is removed from the curing chamber at step 110. The cementitious product may be further cured with air curing plus water spraying at step 112. The air curing plus water spraying of the cementitious product may include curing in air and spraying with water twice a day for a total of 7 days. The cementitious product may also be further cured using air curing at step 114. For example, the cementitious product may be air cured for an additional 28 days.

During curing within the curing chamber at step 108, water reacts with, and results in the hydration of the compounds of the cement binder. It should be understood that only hydration of the calcium silicates may contribute to the strength cementitious product and tricalcium silicate may be responsible for most of the strength developed within the first seven days of curing and hydration of dicalcium silicate may be responsible for strength obtained at longer times. Hydration of tricalcium silicate occurs via the chemical reaction:

$$2Ca_3SiO_5(s)+7H_2O(l) \rightarrow 3CaO.2SiO_2.4H_2O(s)+3Ca(OH)_2(s) \qquad (1)$$

and hydration of dicalcium silicate occurs via the chemical reaction:

$$2Ca_2SiO_4(s)+5H_2O(l) \rightarrow 3CaO.2SiO_2.4H_2O(s)+Ca(OH)_2(s) \qquad (2)$$

In embodiments, the dry steam condenses into liquid water which reacts with the tricalcium silicate to form calcium hydroxide. That is, the dry steam flows into and condenses within pores of the cementitious article to provide moisture (water) within the pores that reacts with the tricalcium silicate to form calcium hydroxide. In the alternative, or in addition to, the dry steam reacts directly with the tricalcium silicate to form calcium hydroxide via the chemical reaction:

$$2Ca_3SiO_5(s)+7H_2O(g) \rightarrow 3CaO.2SiO_2.4H_2O(s) \qquad (3)$$

Also, the dry steam may provide heat, either through heat of condensation or heat of conduction, to the tricalcium silicate which may enhance the kinetics of calcium hydroxide formation.

During curing within the curing chamber at step 108, the $CO_2$ in the mixture of steam and $CO_2$ reacts with the calcium silicates of the cement binder to form calcium carbonate. Particularly, $CO_2$ diffuses within the pores of the cementitious article and solvates with water to form $CO_2$ (aq), which in turn hydrates to form carbonic acid ($H_2CO_3$). The carbonic acid ionizes to form ions of $H^+$, $HCO_3^-$, and $CO_3^{2-}$. The $H^+$ ions reduce the pH of the cementitious system which in turn results in the dissolution of the tricalcium silicate and dicalcium silicate to release ions of $Ca^{2+}$ and $SiO_4^{4-}$. The $Ca^{2+}$ ions react with the $CO_3^{2-}$ ions to form calcium carbonate ($CaCO_3$). The overall reaction of $CO_2$ with tricalcium silicate is:

$$2Ca_3SiO_5(s)+3CO_2(g)+4H_2O(l) \rightarrow 3CaO.2SiO_2.4H_2O(s)+3CaCO_3(s) \qquad (4)$$

and the overall reaction of $CO_2$ with dicalcium silicate is:

$$4Ca_2SiO_2(s)+2CO_2(g)+8H_2O(l) \rightarrow 2(3CaO.2SiO_2.4H_2O)(s)+2CaCO_3(s) \qquad (5)$$

In addition to $CO_2$ reacting with the calcium silicates, the calcium hydroxide formed by the reaction of the calcium silicates with water (e.g., via reactions (1), (2) and/or (3) above) may be converted to calcium carbonate via the overall reaction:

$$Ca(OH)_2(s)+CO_2(g) \rightarrow CaCO_3(s)+H_2O(l) \qquad (6)$$

Accordingly, the $CO_2$ may reduce the amount of calcium hydroxide in the cementitious product while increasing the amount of calcium carbonate.

It should be understood that the reaction of $CO_2$ with tricalcium silicate in the cementitious article to form calcium carbonate, and the reaction of $CO_2$ with calcium hydroxide to form calcium carbonate, increases the strength of the cementitious product. The $CO_2$ also prevents the formation of at least a portion of calcium hydroxide that would form per reactions (1), (2) and/or (3) above, in the absence of $CO_2$ and/or converts a portion of the formed calcium hydroxide into calcium carbonate. That is, the presence of $CO_2$ not only results in the formation of calcium carbonate, but also regulates the formation and amount of calcium hydroxide within cementitious article formed using the method described herein. Such a regulation (e.g., reduction) of the formation of calcium hydroxide may result in a reduction of the heat of hydration within the cementitious article when compared to curing in only steam. Not being bound by theory, the reduction of the heat of hydration within the cementitious article may result in less thermal expansion of and less microcracks in the cementitious article during early stages of curing. It should be understood that the reduction of microcracks within the cementitious article results in an increase in strength by the cementitious product. That is, with less flaws (microcracks) in the cementitious product, an increase in strength is observed when compared to curing in only steam.

Figure 2:
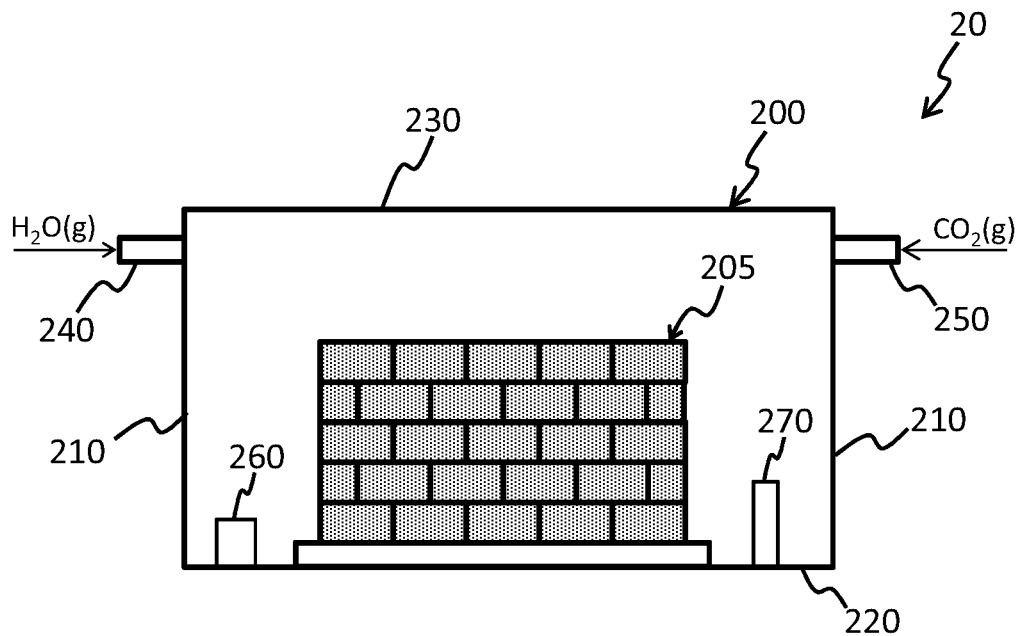
FIG. 2 schematically depicts a curing chamber for curing cementitious articles according to one or more embodiments described herein.

Referring now to FIG. 2, a curing chamber 20 for curing cementitious articles using the method described herein is depicted. The curing chamber 20 includes an enclosure 200 defined by walls 210, a floor 220, and a roof 230. A plurality of cementitious articles 205 may be placed within the enclosure 200. A first inlet 240 and a second inlet 250 are included and may be used for flowing the mixture of steam and $CO_2$ into the enclosure 200. In embodiments, the steam may flow into the enclosure 200 through one inlet (inlet 240) and the $CO_2$, e.g., pure (100 vol %) $CO_2$, may flow into the enclosure 200 through a separate inlet (inlet 250). In the alternative, a single inlet, e.g., the first inlet 240 or the second inlet 250, may be used to flow the mixture of steam and $CO_2$ into the enclosure 200. A humidifier 260 and a heater 270 may be included to control the relative humidity and temperature within the enclosure 200 of the curing chamber 20.

It should be understood that the concentration of $CO_2$ in the mixture of steam and $CO_2$ provides for a desired combination of calcium hydroxide and calcium carbonate in the cementitious product. Particularly, the concentration of $CO_2$ in the mixture of steam and $CO_2$ introduced into the enclosure 200 of the curing chamber 20 results in a desired amount of calcium hydroxide to be formed such that a given amount of calcium hydroxide is present to provide strength and a given amount is present for reaction with $CO_2$ to form calcium carbonate (e.g., per reaction (6) above) to provide strength and sequester $CO_2$.

The method for forming cementitious products as embodied above may be used to form any appropriate cementitious product. Non-limiting examples of article's formed by embodiments of the method include concrete blocks, concrete steps, concrete counter tops and pre-fabricated concrete walls and structures. Various embodiments will be further clarified by the following examples.

EXAMPLES

Referring now to FIGS. 1-2, three sets of concrete compression samples were prepared and cured under different environments in order to determine the effect of curing with a mixture of steam and $CO_2$. The three sets of concrete samples were prepared using the same amount type of cement binder and aggregate, and the same amount of water. The first set of concrete samples were cured using the following curing procedure: air curing for 2 hours; curing in steam for 8 hours (i.e., steam only); curing in air plus water spraying twice a day for a total of 7 days; curing in air for 28 days. The second set of concrete samples were cured using the following curing procedure: air curing for 2 hours; curing in steam plus 10 vol % $CO_2$ for 8 hours (i.e., steam plus 5 vol % $CO_2$); curing in air plus water spraying twice a day for a total of 7 days; curing in air for 28 days. The third set of concrete samples were cured using the following curing procedure: air curing for 2 hours; curing in $CO_2$ for 8 hours (i.e., $CO_2$ only); curing in air plus water spraying twice a day for a total of 7 days; curing in air for 28 days. A summary of the curing procedures for each of the three sets of samples is summarized in Table 2 below. The curing in steam, steam plus 5 vol % $CO_2$, and $CO_2$ was performed in a curing chamber as depicted in FIG. 2. The temperature within the curing chamber was 60° C. and the relative humidity was 60%. Accordingly, the only variable during curing of the three sets of samples was the steam and $CO_2$ concentrations.

TABLE 2

| Curing Step | Sample Set #1 (Atmosphere/Time) | Sample Set #2 (Atmosphere/Time) | Sample Set #3 (Atmosphere/Time) |
|---|---|---|---|
| Step 1 | Air/2 h | Air/2 h | Air/2 h |
| Step 2* | Steam/8 h | Steam + 10 vol % $CO_2$/8 h | $CO_2$/8 h |
| Step 3 | Air + water spraying 2x a day/7 days | Air + water spraying 2x a day/7 days | Air + water spraying 2x a day/7 days |
| Step 4 | Air/28 days | Air/28 days | Air/28 days |

*Step 2 was performed in a curing chamber with a temperature of 60° C. and a relative humidity of 60%

Figure 3:
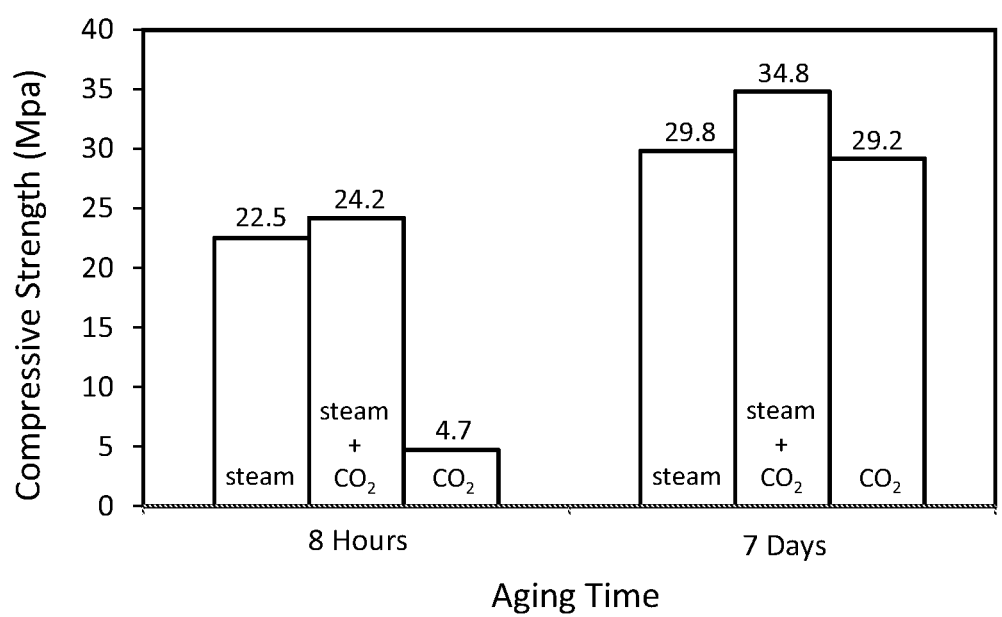
FIG. 3 graphically depicts compressive strength for three sets of concrete samples cured in a curing chamber as depicted in FIG. 2 using curing environments containing different amounts of steam and $CO_2$.

The three sets of samples were each subjected to compressive strength testing after curing within the curing chamber for 8 hours and after air curing with water spraying twice a day for 7 days. The results of the compressive strength testing are shown in FIG. 3. After curing for 8 hours in the curing chamber, the first set of samples (steam only) had a compressive strength of 22.5 megapascals (MPa), the second set of samples (steam plus 10 vol % $CO_2$) had a compressive of strength of 24.2 MPa, and the third set of samples ($CO_2$ only) had a compressive strength of 4.7 MPa. Accordingly, the second set of samples (steam plus 10 vol % $CO_2$) had a 7.6% increase in strength compared to the first set of samples (steam only) and a 415% increase in strength compared to the third set of samples ($CO_2$ only). After air curing plus water spraying twice a day for 7 days, the first set of samples (steam only) had a compressive strength of 29.8 MPa, the second set of samples (steam plus 10 vol % $CO_2$) had a compressive strength of 34.8 MPa, and the third set of samples ($CO_2$ only) had a compressive strength of 29.2 MPa. Accordingly, the second set of samples (steam plus 10 vol % $CO_2$) had a 16.8% increase in strength compared to the first set of samples (steam only) and a 19.2% increase in strength compared to the third set of samples ($CO_2$ only).

The three sets of samples were also analyzed for $CO_2$ uptake and the results are summarized in Table 3 below. As shown in Table 3 below, the first set of samples (steam only) had an average $CO_2$ uptake, in weight percent (wt %), of 6.25 wt %. The second set of samples (steam plus 10 vol % $CO_2$) had an average $CO_2$ uptake of 20.05 wt %. The third set of samples ($CO_2$ only) had an average $CO_2$ uptake of 9.2 wt %. Accordingly, the second set of samples (steam plus 10 vol % $CO_2$) had a 220% increase in $CO_2$ uptake compared to the first set of samples (steam only) and a 118% increase in $CO_2$ uptake compared to the third set of samples ($CO_2$ only). Accordingly, curing with steam plus 10 vol % $CO_2$ provided enhanced $CO_2$ sequestration compared to curing in pure $CO_2$. As noted above, and not being bound by theory, the concentration of $CO_2$ in the steam plus $CO_2$ gas mixture introduced into the interior 250 of the curing chamber 20 results in a desired amount of calcium hydroxide that may provide strength to cementitious products and serve as a source for calcium carbonate formation.

TABLE 3

| Sample Set ↓↓ | Sample 1 (wt %) | Sample 2 (wt %) | Average (wt %) |
|---|---|---|---|
| Steam Only | 6.0 | 6.5 | 6.25 |
| Steam + 10 vol % $CO_2$ | 20.0 | 20.1 | 20.05 |
| $CO_2$ Only | 8.9 | 9.5 | 9.2 |

Figure 4:
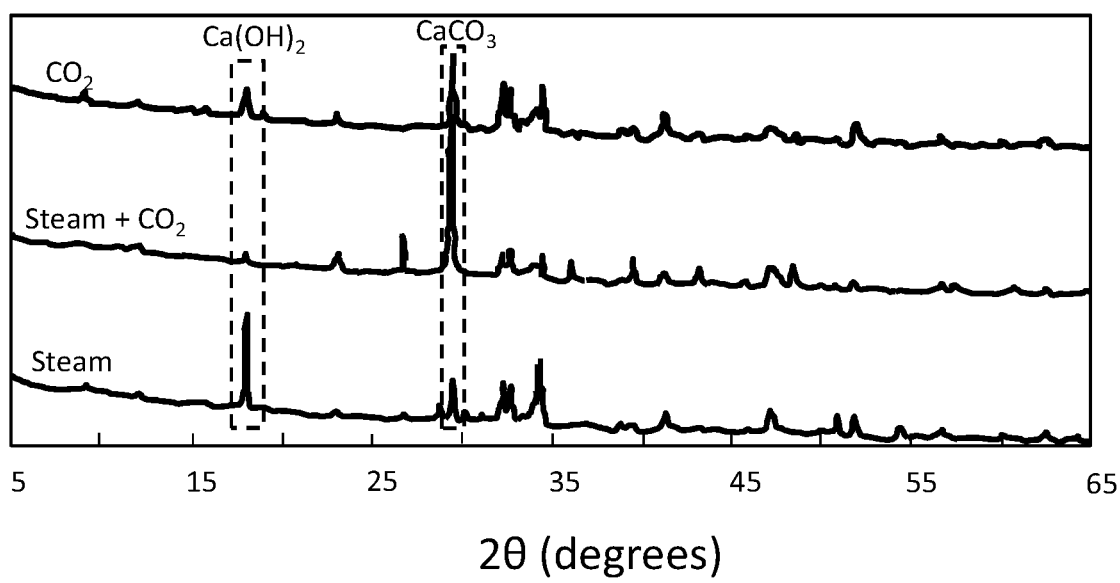
FIG. 4 graphically depicts x-ray diffraction scans for three sets of concrete samples cured in a curing chamber as depicted in FIG. 2 using curing environments containing different amounts of steam and $CO_2$.

The three sets of samples were also analyzed for phase or compound identification after the 7 days of air curing with water spraying using x-ray diffraction (XRD) and FIG. 4 graphically depicts XRD scans of each of the three samples. Regarding the XRD scan for the first set of samples (labeled "Steam"), a relatively high peak for calcium hydroxide (Ca(OH)$_2$) is observed while a relatively low peak is observed for calcium carbonate. Regarding the XRD scan for the third set of samples (labeled "CO$_2$") a relatively low peak is observed for calcium hydroxide and a relatively high peak is observed for calcium carbonate. This result is in agreement with the CO$_2$ uptake shown in Table 3. However, referring to the XRD scan for the second set of samples (steam plus CO$_2$), a relatively low peak is observed for calcium hydroxide and the highest peak for calcium carbonate (compared to the first and third set of samples) is observed. Accordingly, the XRD scans, in agreement with the CO$_2$ uptake results shown in Table 3, demonstrate curing with the steam plus CO$_2$ gas mixtures described herein enhances the CO$_2$ sequestration by cementitious products when compared to curing with steam only and CO$_2$ only.

Because the method for forming cementitious products described herein uses a mixture of steam and CO$_2$, the CO$_2$ uptake by cementitious articles is significantly enhanced compared to curing in only steam and curing in only CO$_2$. Also, the mixture of steam and CO$_2$ described herein may provide an increase in strength for cementitious products. Not being bound by theory, the increase in strength is due to the formation and increased amounts of calcium carbonate within the cementitious products and/or a reduction in flaws within the cementitious products. Such an increase in CO$_2$ uptake and strength for cementitious products manufactured using the method described herein may reduce the cost of manufacturing and provide sources for a CO$_2$ sequestration.

Unless otherwise expressly stated, it is in no way intended that any methods set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims their equivalents.

What is claimed is:

1. A method for curing cementitious articles, the method comprising:
   providing a cementitious article formed from a mixture of a cement binder, aggregate, and water, the cement binder comprising Ca$_3$SiO$_5$;
   placing the cementitious article in a curing chamber;
   maintaining a curing relative humidity between about 40% and about 80% within the curing chamber;
   maintaining a curing temperature between about 50° C. and about 80° C. within the curing chamber;
   curing the cementitious article by flowing a mixture of dry steam and CO$_2$ into the curing chamber while maintaining the curing relative humidity and the curing temperature for a duration between about 4 hours and about 24 hours, wherein
   a concentration of CO$_2$ in the mixture of dry steam and CO$_2$ is between about 2.5% and about 20.0%, by volume,
   Ca(OH)$_2$ is formed by at least one of the reactions

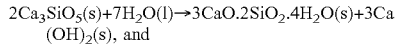

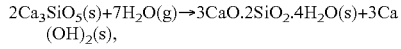

CO$_2$ from the mixture of dry steam and CO$_2$ reacts with the cementitious article to form CaCO$_3$ in the cementitious article by at least one of the reactions

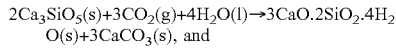

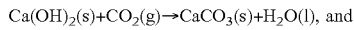

the cured cementitious article comprises a CO$_2$ uptake equal to or greater than 15%, by weight.

2. The method of claim 1, wherein flowing the mixture of dry steam and CO$_2$ into the curing chamber comprises flowing dry steam into the curing chamber through a first inlet and flowing pure CO$_2$ into the curing chamber through a second inlet that is different than the first inlet, and flowing of the dry steam through the first inlet and flowing of the CO$_2$ through the second inlet a maintains the concentration of CO$_2$ between about 2.5% and about 20.0%, by volume, in the curing chamber.

3. The method of claim 1, wherein the concentration of CO$_2$ in the mixture of dry steam and CO$_2$ flowing into the curing chamber is between about 5% and about 10%, by volume.

4. The method of claim 1, wherein the curing relative humidity is between about 50% and about 70%.

5. The method of claim 1, wherein the curing temperature is between about 50° C. and about 70° C.

6. The method of claim 1, wherein the cementitious article is cured in the curing chamber for a duration between about 4 hours and about 16 hours.

7. The method of claim 1, wherein the cementitious article is cured in the curing chamber between about 6 hours and about 10 hours.

8. The method of claim 1, wherein the cured cementitious article comprises greater than or equal to 20%, by weight, CO$_2$ uptake.

9. The method of claim 1, wherein the cured cementitious article comprises greater than or equal to 25%, by weight, CO$_2$ uptake.

10. The method of claim 1, further comprising curing the cementitious article in air prior to curing the cementitious article in the curing chamber for a duration between about 1 hour and about 4 hours.

11. The method of claim 1, further comprising air curing and water spraying the cementitious article after curing the cementitious article in the curing chamber.

12. The method of claim 11, further comprising air curing the cementitious article after air curing and water spraying the cementitious article.

13. The method of claim 1 comprising:
  maintaining the curing relative humidity between about 50% and about 70% within the curing chamber; and
  maintaining a curing temperature between about 50° C. and about 70° C. within the curing chamber.

* * * * *